United States Patent
Carrier et al.

(10) Patent No.: US 11,461,540 B2
(45) Date of Patent: Oct. 4, 2022

(54) CROSS-DOCUMENT PROPAGATION OF ENTITY METADATA

(71) Applicant: INTERNATIONAL BUSINESS MACHINES CORPORATION, Armonk, NY (US)

(72) Inventors: Scott Carrier, New Hill, NC (US); Dwi Sianto Mansjur, Cary, NC (US); Paul Lewis Felt, Springville, UT (US); Brendan Bull, Durham, NC (US)

(73) Assignee: INTERNATIONAL BUSINESS MACHINES CORPORATION, Armonk, NY (US)

(*) Notice: Subject to any disclaimer, the term of this patent is extended or adjusted under 35 U.S.C. 154(b) by 0 days.

(21) Appl. No.: 16/904,748

(22) Filed: Jun. 18, 2020

(65) Prior Publication Data

US 2021/0397782 A1 Dec. 23, 2021

(51) Int. Cl.
| | |
|---|---|
| G06F 17/00 | (2019.01) |
| G06F 40/169 | (2020.01) |
| G06F 16/93 | (2019.01) |
| G06F 40/134 | (2020.01) |
| G06F 16/955 | (2019.01) |
| G06F 16/33 | (2019.01) |

(52) U.S. Cl.
CPC ........ *G06F 40/169* (2020.01); *G06F 16/3344* (2019.01); *G06F 16/93* (2019.01); *G06F 16/9558* (2019.01); *G06F 40/134* (2020.01)

(58) Field of Classification Search
CPC ...... G06F 40/169; G06F 40/134; G06F 16/93; G06F 16/3344; G06F 16/16; G06F 16/9558; G06F 16/955
See application file for complete search history.

(56) References Cited

U.S. PATENT DOCUMENTS

| | | | | |
|---|---|---|---|---|
| 6,052,693 | A | 4/2000 | Smith et al. | |
| 6,438,543 | B1 | 8/2002 | Kazi et al. | |
| 7,272,594 | B1* | 9/2007 | Lynch | G06F 16/838 |
| 7,742,953 | B2* | 6/2010 | King | G06Q 10/10 |
| | | | | 705/26.1 |
| 8,954,434 | B2* | 2/2015 | Ahn | G06F 16/313 |
| | | | | 707/737 |
| 8,990,235 | B2* | 3/2015 | King | G06F 40/197 |
| | | | | 707/769 |
| 9,244,894 | B1* | 1/2016 | Dale | G06F 40/279 |
| 9,489,350 | B2* | 11/2016 | Crochet | G06F 40/194 |
| 9,569,436 | B2* | 2/2017 | Lee | G06Q 10/10 |

(Continued)

*Primary Examiner* — Laurie A Ries
(74) *Attorney, Agent, or Firm* — Cantor Colburn LLP; Kelsey M. Skodje

(57) ABSTRACT

Embodiments include cross-document propagation of entity metadata. Aspects include identifying a set of documents from a plurality of documents, the set of documents being related to one another and identifying a concept in a first document of the set of documents and creating an annotation corresponding to the concept. Aspects also include evaluating the annotation from the first document against all of the documents in the set of documents and identifying a concept match between the annotation and a mention discovered in a second document in the set of documents. Aspects further include creating a metadata linkage between the concept in the first document to the mention in the second document.

16 Claims, 8 Drawing Sheets

(56) References Cited

U.S. PATENT DOCUMENTS

| | | | |
|---|---|---|---|
| 9,836,460 B2* | 12/2017 | Elias | G06F 16/93 |
| 10,340,033 B2 | 7/2019 | Bucur et al. | |
| 10,580,520 B2* | 3/2020 | Schulte | G16H 10/60 |
| 10,685,032 B2* | 6/2020 | Hopkins | G06F 40/154 |
| 10,817,655 B2* | 10/2020 | Knudson | G06F 40/169 |
| 2003/0061200 A1* | 3/2003 | Hubert | G06F 16/93 |
| 2006/0150079 A1* | 7/2006 | Albornoz | G06F 16/93 |
| | | | 715/230 |
| 2006/0230333 A1* | 10/2006 | Racovolis | G06F 40/137 |
| | | | 715/205 |
| 2007/0033221 A1* | 2/2007 | Copperman | G06F 16/36 |
| 2009/0024411 A1* | 1/2009 | Albro | G16H 15/00 |
| | | | 705/2 |
| 2009/0063557 A1* | 3/2009 | MacPherson | G06N 5/02 |
| 2010/0228693 A1* | 9/2010 | Dawson | G06F 16/322 |
| | | | 706/12 |
| 2012/0089629 A1* | 4/2012 | Koll | G06F 16/243 |
| | | | 707/E17.073 |
| 2012/0131430 A1* | 5/2012 | Chen | G06F 40/169 |
| | | | 715/206 |
| 2012/0166924 A1* | 6/2012 | Larson | G06F 16/94 |
| | | | 715/205 |
| 2013/0305149 A1* | 11/2013 | Dimitrov | G06F 16/93 |
| | | | 715/273 |
| 2014/0115436 A1* | 4/2014 | Beaver | G06F 40/169 |
| | | | 715/229 |
| 2015/0039344 A1* | 2/2015 | Kinney | G16H 10/60 |
| | | | 705/3 |
| 2015/0242383 A1* | 8/2015 | Arputharaj | H04N 1/00347 |
| | | | 715/230 |
| 2015/0294069 A1 | 10/2015 | Shah | |
| 2015/0324454 A1* | 11/2015 | Roberts | G06F 16/248 |
| | | | 707/734 |
| 2016/0019299 A1* | 1/2016 | Boloor | G06F 16/9535 |
| | | | 705/3 |
| 2016/0063656 A1* | 3/2016 | Vattikonda | G06Q 10/00 |
| | | | 705/326 |
| 2016/0225059 A1* | 8/2016 | Chow | G06F 40/169 |
| 2016/0350271 A1* | 12/2016 | Dai | G06F 3/1203 |
| 2017/0132309 A1 | 5/2017 | Bufe, III et al. | |
| 2018/0046764 A1* | 2/2018 | Katwala | G06F 40/169 |
| 2019/0095420 A1 | 3/2019 | Galitsky | |
| 2019/0129973 A1* | 5/2019 | Truong | G06F 40/166 |
| 2019/0163875 A1* | 5/2019 | Allen | G16H 50/20 |
| 2019/0287684 A1 | 9/2019 | Wu et al. | |
| 2020/0134005 A1* | 4/2020 | Mitra | G06F 16/316 |
| 2020/0293712 A1* | 9/2020 | Potts | G16H 10/60 |
| 2021/0142916 A1* | 5/2021 | Webber | G16H 50/70 |

* cited by examiner

CROSS-DOCUMENT PROPAGATION OF ENTITY METADATA

BACKGROUND

The present invention generally relates to programmable computers, and more specifically, to cross-document propagation of entity metadata using programmable computers.

Natural language processing (NLP) is a field of computer science, artificial intelligence, and linguistics concerned with the interactions between computers and human (natural) languages. As such, NLP is related to the area of human-computer interaction. Many challenges in NLP involve natural language understanding, i.e. enabling computers to derive meaning from human or natural language input.

NLP is often used to identify concepts in a document and to create metadata regarding the identified concepts. However, when evaluating a set of documents, metadata regarding the identified concepts created by the NLP is only associated with a source document that included the identified concept.

SUMMARY

Embodiments of the present invention are directed to cross-document propagation of entity metadata. A non-limiting example computer-implemented method includes identifying a set of documents from a plurality of documents, the set of documents being related to one another and identifying a concept in a first document of the set of documents and creating an annotation corresponding to the concept. The method also includes evaluating the annotation from the first document against all of the documents in the set of documents and identifying a concept match between the annotation and a mention discovered in a second document in the set of documents. The method further includes creating a metadata linkage between the concept in the first document to the mention in the second document.

A non-limiting example system includes a memory having computer readable instructions, and one or more processors for executing the computer readable instructions, the computer readable instructions controlling the one or more processors to perform operations including identifying a set of documents from a plurality of documents, the set of documents being related to one another and identifying a concept in a first document of the set of documents and creating an annotation corresponding to the concept. The operations also include evaluating the annotation from the first document against all of the documents in the set of documents and identifying a concept match between the annotation and a mention discovered in a second document in the set of documents. The operations further include creating a metadata linkage between the concept in the first document to the mention in the second document.

A non-limiting example computer program product includes a computer readable storage medium having program instructions embodied therewith, the program instructions executable by one or more processors to cause the one or more processors to perform operations including identifying a set of documents from a plurality of documents, the set of documents being related to one another and identifying a concept in a first document of the set of documents and creating an annotation corresponding to the concept. The operations also include evaluating the annotation from the first document against all of the documents in the set of documents and identifying a concept match between the annotation and a mention discovered in a second document in the set of documents. The operations further include creating a metadata linkage between the concept in the first document to the mention in the second document.

Additional technical features and benefits are realized through the techniques of the present invention. Embodiments and aspects of the invention are described in detail herein and are considered a part of the claimed subject matter. For a better understanding, refer to the detailed description and to the drawings.

BRIEF DESCRIPTION OF THE DRAWINGS

The specifics of the exclusive rights described herein are particularly pointed out and distinctly claimed in the claims at the conclusion of the specification. The foregoing and other features and advantages of the embodiments of the invention are apparent from the following detailed description taken in conjunction with the accompanying drawings in which:

DETAILED DESCRIPTION

One or more embodiments of the present invention provide methods, systems and computer program product for cross-document propagation of entity metadata. In exemplary embodiments, a set of documents that are related to each other are identified from a plurality of documents. A natural language processing (NLP) algorithm is applied to each of the documents in the set of documents to identify concepts in each document and to create an annotation for each concept. In exemplary embodiments, the concepts identified for each document are evaluated against the concepts identified in the remaining documents in the set of documents to identify a concept match. Based on detecting a concept match, a metadata linkage is created between the documents containing the matching concepts.

In exemplary embodiments, creating metadata linkages between documents having matching concepts causes all mentions for a concept across the set of documents to be aggregated, such that a user viewing a document having a mention of the concept to get the full view of a concept. In one example, the set of documents includes a first document with a mention of a start date for a medication, a second document that includes a mention of a dosage for the medication, and a third document that includes a mention of a stop date for the medication. In exemplary embodiments, the concept of the medication in each of the documents is used to create a concept match and accordingly, all mentions of the medication will be linked such that a user viewing any one of the documents will be able get the full view of the concept, i.e., the start date, stop date and dosage of the medication.

In one embodiment, the plurality of documents are medical records and the set of documents are related to a common subject, such as a patient. In one embodiment, the determination that the set of documents are related to a common subject is based on metadata of each of the documents, such as a patient identification number. In another embodiment, the determination that the set of documents are related to a common subject is based on an analysis of data extracted from each of the documents, such as a patient name, date of birth, social security number, or the like.

Figure 1:
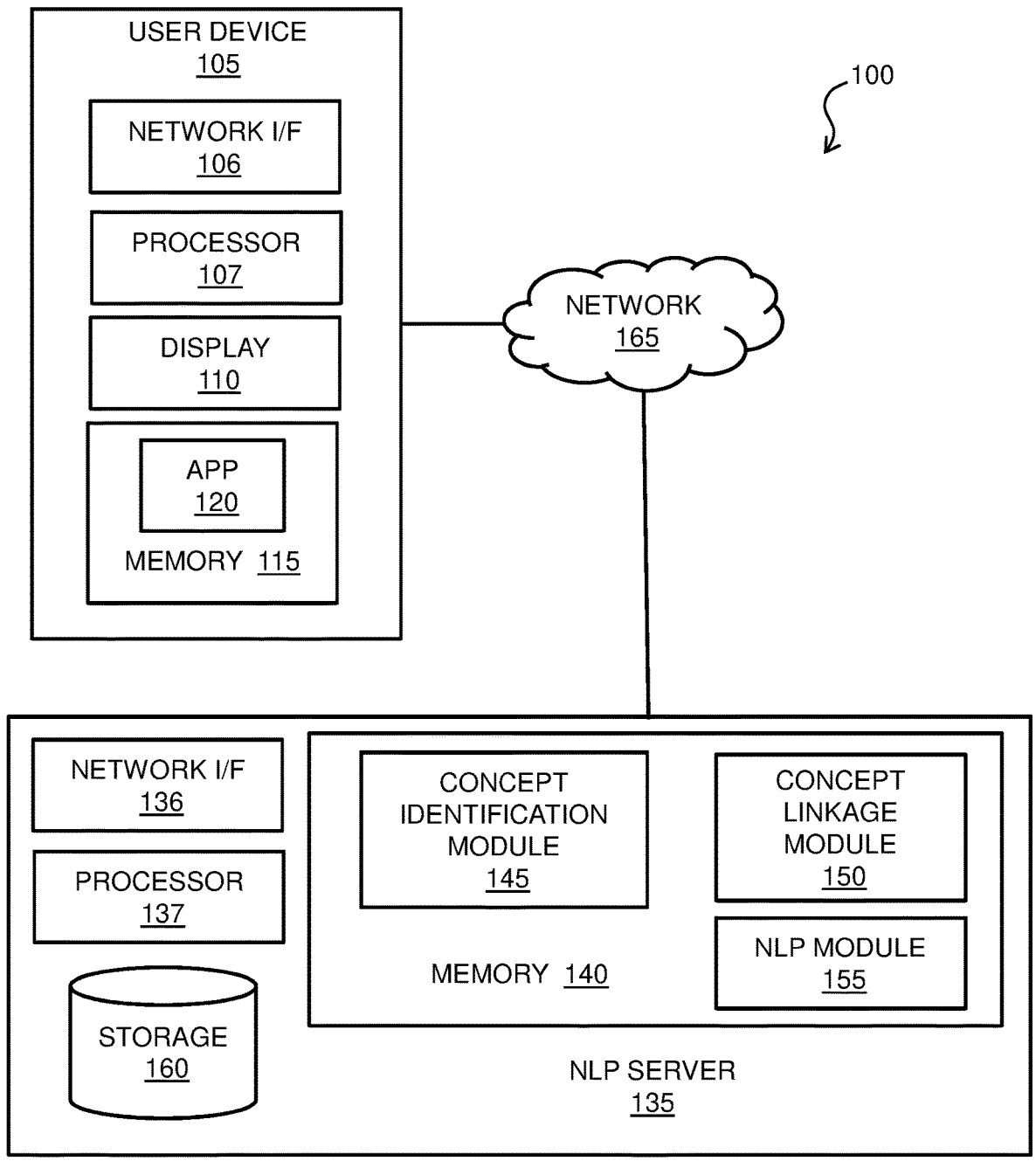
FIG. 1 is a block diagram depicting a computing environment for cross-document propagation of entity metadata in accordance with an embodiment of the present invention.

FIG. 1 is a block diagram depicting a system 100 for cross-document propagation of entity metadata in accordance with an embodiment of the present invention. As depicted, system 100 includes a user device 105 and an NLP server 135 that are connected by a network 165. It is to be understood that the functional division among components of system 100 has been chosen for purposes of explaining present invention embodiments and is not to be construed as a limiting example.

In one embodiment, the user device 105 includes a network interface (I/F) 106, at least one processor 107, a display 110, and memory 115. The memory 115 may include applications 120. User device 105 may include laptop computers, tablet computers, netbook computers, a personal computer (PC), a desktop computer, a personal digital assistant (PDA), smart phones, thin clients, or any programmable electronic devices capable of executing computer readable program instructions. The network interface 106 enables components of user device 105 to send and receive data over a network, such as network 165. The user device 105 may include internal and external hardware components, as depicted and described in further detail with respect to FIG. 8.

In one embodiment, the display 110 may include any electronic device capable of presenting information in a visual form. For example, a display of displays 110 may be a liquid crystal display (LCD), a cathode ray tube (CRT) display, a light-emitting diode (LED) display, an electronic ink display, and the like. Information relating to an NLP service hosted on NLP server 135 may be displayed to a user of user devices 105 via displays 110.

In one embodiment, the applications 120 may include one or more modules or units to perform various functions of present invention embodiments described below. Applications 120 may be implemented by any combination of any quantity of software and/or hardware modules or units and may reside within memories 115 of user devices 105 for execution by a processor, such as processors 107.

Instances of applications 120 may enable users of any of user devices 105 to send messages (e.g., any appropriate text, including queries) to NLP server 135 for processing by NLP module 155. In some embodiments of the invention, the messages received from user devices 105 can be processed by NLP server 135 and used to retrieve information from an information source (e.g., information is stored in storage 160, and/or from an external database that is in communication with NLP server 135 via network 165, in various embodiments of the invention). In response to a processed message, retrieved information can be provided back to the sending user device of user devices 105 via applications 120. Applications 120 can include a plurality of different applications, each application tailored to a particular type of user.

NLP server 135 includes a network interface 136, at least one processor 137, memory 140, and storage 160. The storage 160 is configured to store a plurality of documents and metadata related to the documents. Memory 140 includes a concept identification module 145, concept linkage module 150, and a NLP module 155. In various embodiments of the present invention, NLP server 135 may include a laptop computer, a tablet computer, a netbook computer, a personal computer (PC), a desktop computer, a personal digital assistant (PDA), a smart phone, or any programmable electronic device capable of executing computer readable program instructions. Network interface 136 enables components of NLP server 135 to send and receive data over a network, such as network 165. In general, NLP server 135 and its modules may perform cross-document propagation of entity metadata for the documents stored in the storage 160. The NLP server 135 may include internal and external hardware components, as depicted and described in further detail with respect to FIG. 8.

Concept identification module 150, concept linkage module 145, and NLP module 155 may include one or more modules or units to perform various functions of present invention embodiments described below. Concept identification module 150, concept linkage module 145, and NLP module 155 may be implemented by any combination of any quantity of software and/or hardware modules or units and may reside within memory 140 of NLP server 135 for execution by a processor, such as processor 137.

In exemplary embodiments, the concept identification module 145 is configured to identify one or more concepts in a document and to create an annotation corresponding to the identified concept. In one embodiment, the annotation includes an identification of the concept and one or more pieces of data extracted from the document regarding the concept. In one example, the document is a medical record for an individual that includes a blood pressure reading for that individual, which is identified as a concept. In this example, the annotation includes an indication of the concept of blood pressure and the extracted blood pressure reading from the document. The annotation may also include a date that the blood pressure reading was taken that was extracted from the document.

In exemplary embodiments, the concept linkage module 150 is configured to identify concepts among the set of documents that are related to one another and to create a metadata linkage between the concepts and documents. In one embodiment, the concept linkage module 150 may process an ontology of concepts alone or in combination with data obtained from lexical corpora to generate concept linkages. In particular, concept linkage module 150 extracts training examples for a concept from neighboring context windows. Each context window may include other concepts that are linked to a selected concept according to the hierarchy of the ontology. For example, training windows for a concept may include one or more parent concepts, one or more child concepts, one or more grandchild concepts, etc. Concept linkage module 150 may generate a vector for each concept in an ontology, and train concept embeddings using the vectors. A hierarchical ontology that is processed by concept linkage module 150 may have any number of concepts that form any number of hierarchical levels. A hierarchical ontology includes concepts and relations between concepts. A hierarchical ontology may include any known or other ontology, such as the UMLS®, Gene Ontology (GO), or Systematized Nomenclature of Medicine—Clinical Terms (SNOMED-CT). The ontology and lexical corpora that are processed by concept linkage module 150 may be stored in any appropriate computer device, including but not limited to storage 160 or a remote database that is in communication with NLP server 135 via network 165.

In exemplary embodiments, the NLP module 155 may perform any appropriate natural language processing tasks for the concept identification module 145 and/or the concept linkage module 150. For example, NLP module 155 may utilize a vector space model to perform tasks such as topic recognition, sentiment analysis, question answering, machine translation, word sense disambiguation, and the like.

In exemplary embodiments, storage 160 may include any non-volatile storage media known in the art. For example, storage 160 can be implemented with a tape library, optical library, one or more independent hard disk drives, or multiple hard disk drives in a redundant array of independent disks (RAID). Similarly, data in storage 160 may conform to any suitable storage architecture known in the art, such as a file, a relational database, an object-oriented database, and/or one or more tables. Storage 160 may store data relating to developing vector space models and/or performing natural language processing, including one or more lexical corpora, one or more ontologies of concepts, vector representations of concept embeddings and/or word embeddings, user-specific concept metrics, and the like.

In exemplary embodiments, Network 165 may include a local area network (LAN), a wide area network (WAN) such as the Internet, or a combination of the two, and includes wired, wireless, or fiber optic connections. In general, network 165 can be any combination of connections and protocols known in the art that will support communications between user devices 105 and NLP server 135 via their respective network interfaces in accordance with embodiments of the present invention.

It is to be understood that the block diagram of FIG. 1 is not intended to indicate that the system 100 is to include all of the components shown in FIG. 1. Rather, the system 100 can include any appropriate fewer or additional components not illustrated in FIG. 1 (e.g., additional user devices, network connections, databases, memory components, embedded controllers, functional blocks, connections between functional blocks, modules, inputs, outputs, etc.). Further, the embodiments described herein with respect to system 100 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Figure 2:
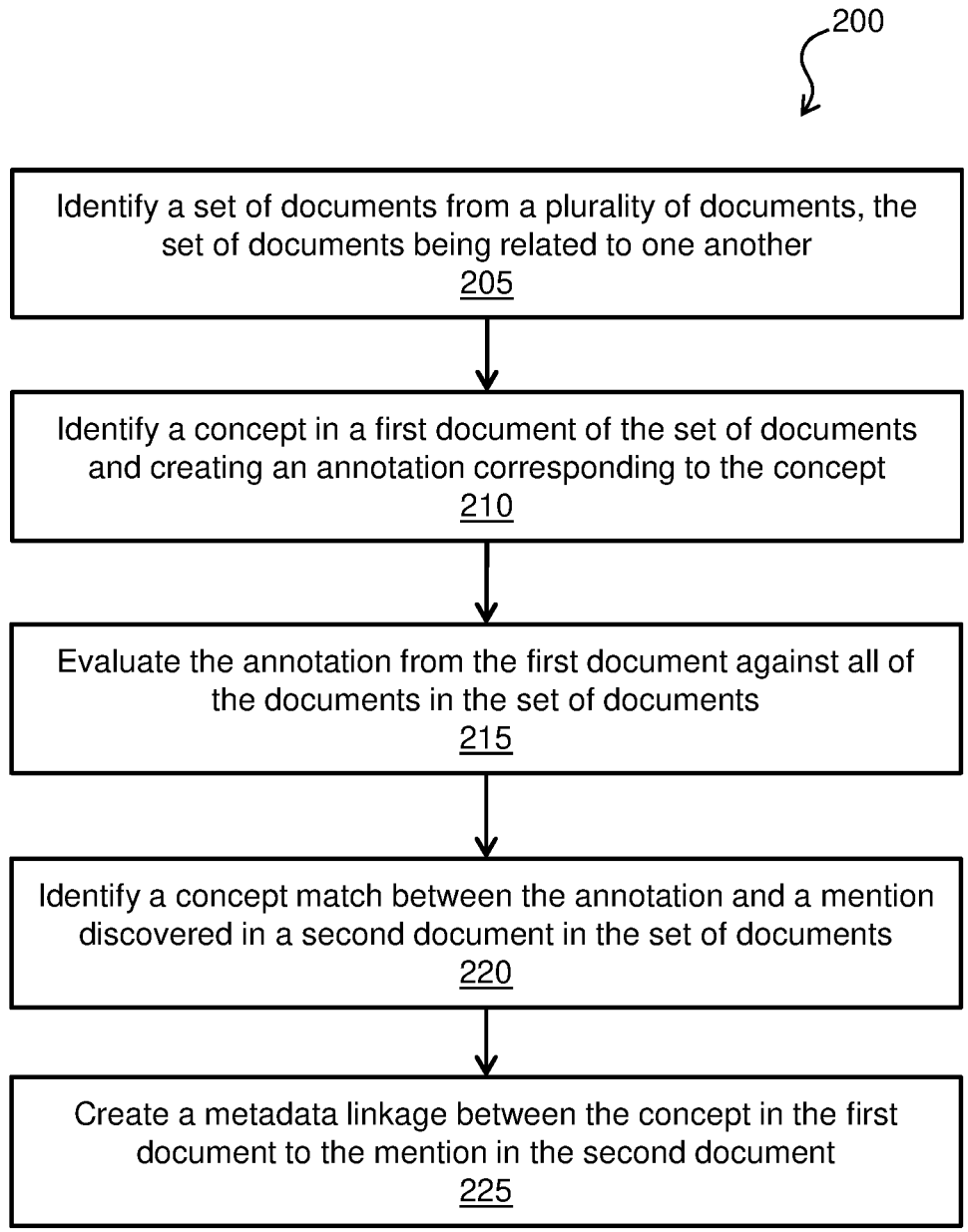
FIG. 2 is a flow diagram of a process for cross-document propagation of entity metadata in accordance with one or more embodiments of the present invention.

FIG. 2 shows a process flow diagram of a method 200 for cross-document propagation of entity metadata in accordance with one or more embodiments of the present invention. Embodiments of method 200 of FIG. 2 can be implemented by the system 100 of FIG. 1. As shown at block 205, the method 200 includes identifying a set of documents from a plurality of documents, the set of documents being related to one another. In one embodiment, each of the plurality of documents includes metadata that identifies a subject of the document. In another embodiment, the subject of the document is identified using NLP on the contents of the document. The set of documents are identified as being related to one another based at least in part upon a determination that each of the set of documents relates to a common subject.

The method 200 also includes identifying a concept in a first document of the set of documents and creating an annotation corresponding to the concept, as shown at block 210. In one embodiment, a concept identification module, such as the one show in FIG. 1, is used to identify a concept in a first document of the set of documents. Next, as shown at block 215, the method 200 includes evaluating the annotation from the first document against all of the documents in the set of documents. The method 200 also includes identifying a concept match between the annotation and a mention discovered in a second document in the set of documents, as shown at block 220. In one embodiment, a concept linkage module, such as the one show in FIG. 1, is used to identify a concept match between the annotation and the mention in the second document. In exemplary embodiments, the concept and the mention are identified based at least in part on a natural language processing (NLP) analysis of the first document and the second document, respectively.

The method 200 further includes creating a metadata linkage between the concept in the first document to the mention in the second document, as shown at block 225. In one embodiment, the metadata linkage is stored in the metadata of the first document and the second document. In exemplary embodiments, after the set of documents have been processed and the metadata linkages have been stored, when a document is displayed to a user, the document will include annotations that are used to provide the user with access to data and links to related documents.

In on example, a document having a dosage of a n=medication is displayed to a user. The document includes an annotation, which may be presented as a footnote or popup window, that includes a starting date for the medication that was obtained from another document. Optionally, the annotation can also include a link to the document that the starting date was obtained from.

The process flow diagram of FIG. 2 is not intended to indicate that the operations of the method 200 are to be executed in any particular order, or that all of the operations of the method 200 are to be included in every case. Additionally, the method 200 can include any suitable number of additional operations.

Figure 3:
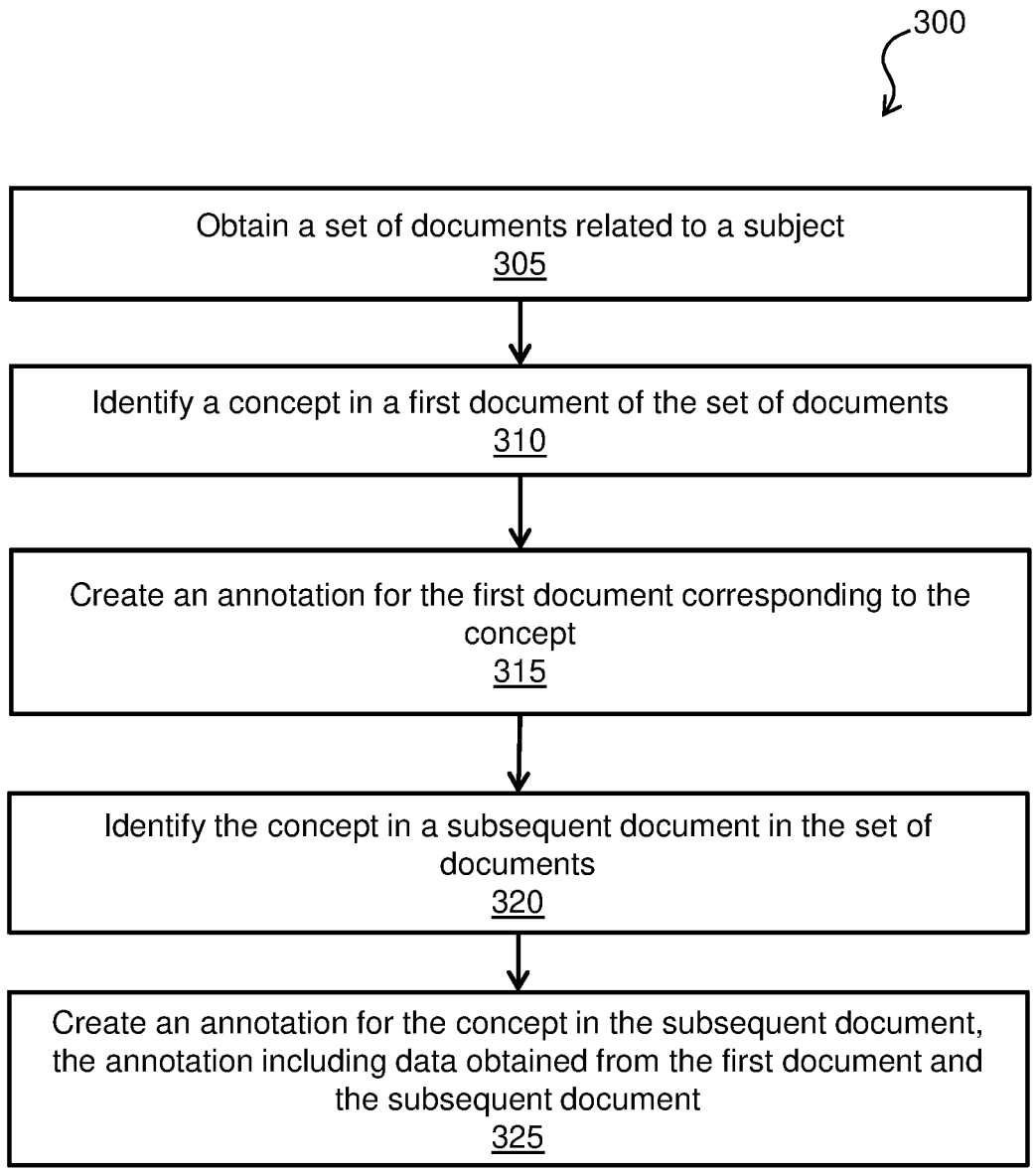
FIG. 3 is a flow diagram of another process for cross-document propagation of entity metadata in accordance with one or more embodiments of the present invention.

FIG. 3 shows a process flow diagram of a method 300 for cross-document propagation of entity metadata in accordance with one or more embodiments of the present invention. Embodiments of method 300 of FIG. 3 can be implemented by the system 100 of FIG. 1. As shown at block 305, the method 300 includes obtaining a set of documents related to a subject. In one embodiment, the set of documents are retrieved from a central repository. In another embodiment, the set of documents are obtained by scanning a set of physical documents. In exemplary embodiments, the set of documents are processed in a chronological order that the documents were created or ordered. The method 300 includes identify a concept in a first document of the set of documents, as shown at block 310. In one embodiment, a concept identification module, such as the one show in FIG. 1, is used to identify a concept in a first document of the set of documents. Next, as shown at block 315, the method 300 includes creating an annotation for the first document corresponding to the concept. In exemplary embodiments, the annotation includes an identification of the concept and data extracted from the first document relating to the concept. In one embodiment, the annotation is stored in the metadata associated with the first document.

The method 300 also includes identifying the concept in a subsequent document in the set of documents, as shown at block 320. In one embodiment, a concept identification module, such as the one show in FIG. 1, is used to identify the concept in the subsequent document of the set of documents. Next, as shown at block 325, the method includes creating an annotation for the concept in the subsequent document, the annotation including data obtained from the first document and the subsequent document. In one embodiment, the annotation is stored in the metadata associated with the subsequent document. In exemplary embodiments, the annotation stored in the metadata associated with the subsequent document includes a link to the first document.

In exemplary embodiments, the method 300 is configured to propagate concept metadata to annotations in subsequent documents deemed to be related to annotations from prior documents. By processing and analyzing metadata across a set of documents pertaining to a common subject, rather than analyzing each document separately, the quality of the enrichment process for the entire set of documents can be increased.

The process flow diagram of FIG. 3 is not intended to indicate that the operations of the method 300 are to be executed in any particular order, or that all of the operations of the method 300 are to be included in every case. Additionally, the method 300 can include any suitable number of additional operations.

Figure 4:
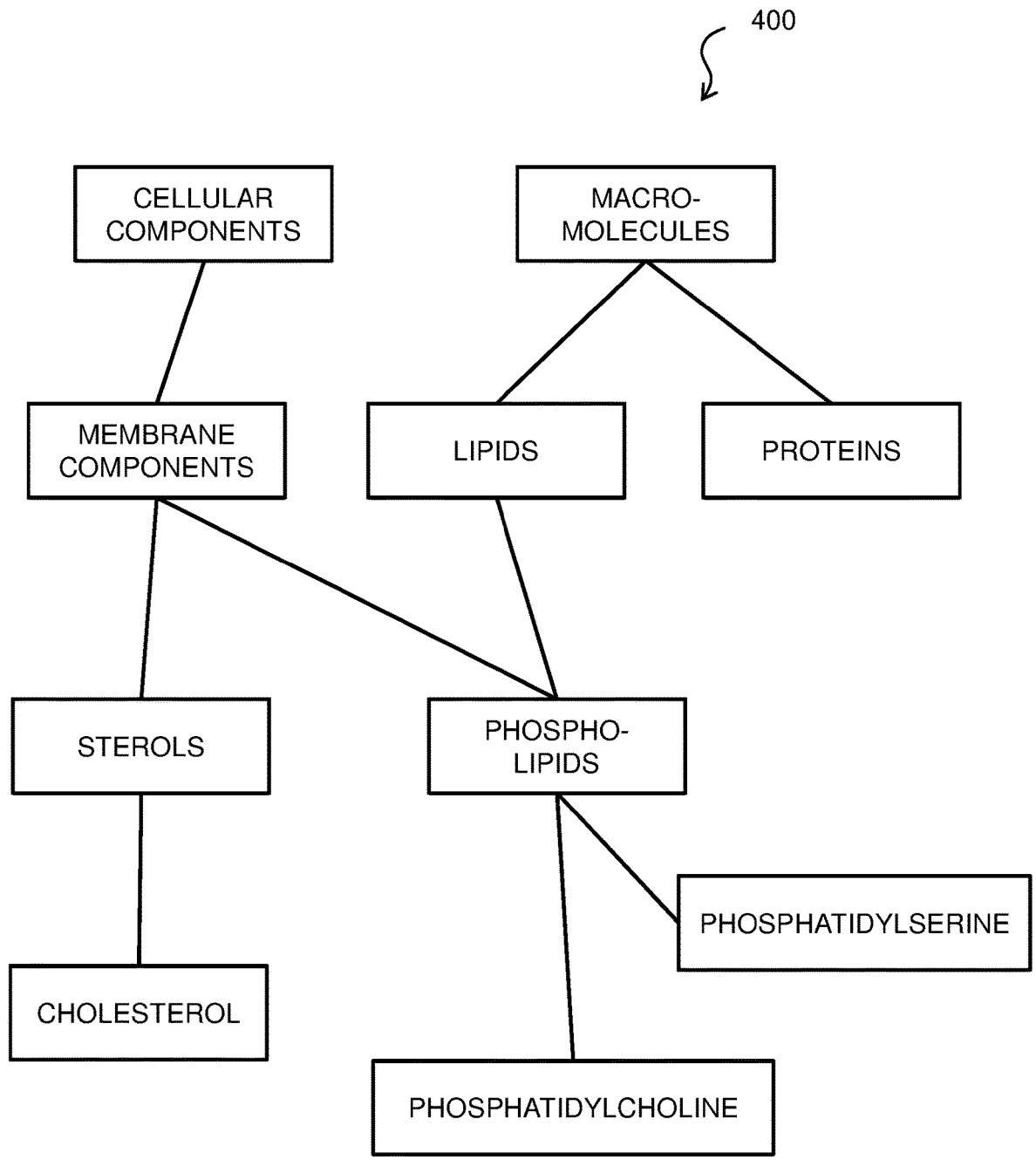
FIG. 4 is a block diagram depicting a portion of a hierarchical ontology in accordance with an embodiment of the present invention.

FIG. 4 is a block diagram depicting a portion of a hierarchical ontology 400 in accordance with an embodiment of the present invention. As depicted, the portion of a hierarchical ontology 400 includes concepts that are linked to each other. Each link may indicate a relationship between two concepts, and each concept may be placed at a particular hierarchical level to establish parent and child concepts for a selected concept. For example, the concept "phospholipids" has two child concepts "phosphatidylcholine" and "phosphatidylserine," and has two parent concepts, "membrane components" and "lipids."

Figure 5:
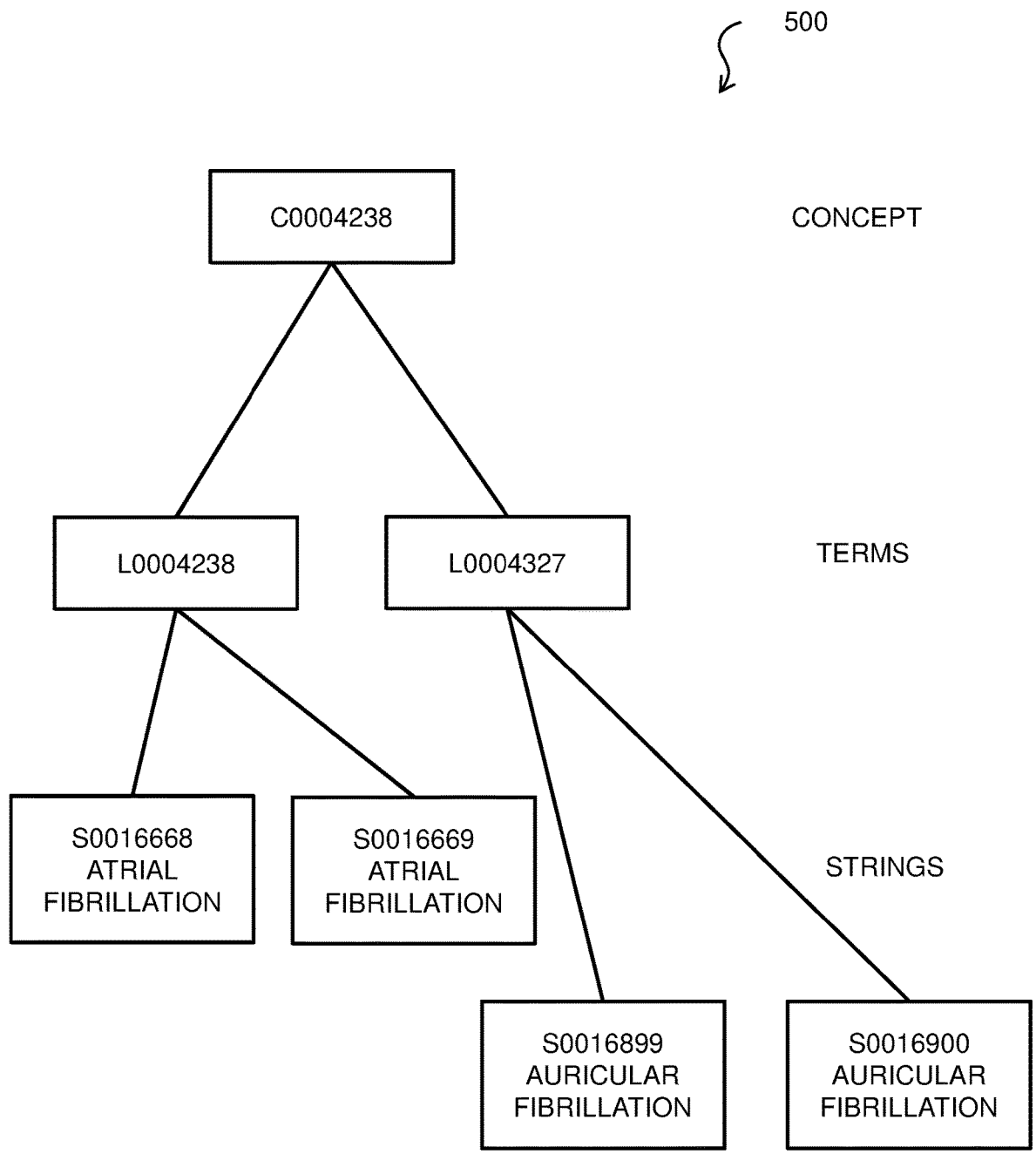
FIG. 5 is a block diagram depicting a portion of a concept hierarchy in accordance with an embodiment of the present invention.

FIG. 5 is a block diagram depicting a portion of a concept hierarchy 500 in accordance with an embodiment of the present invention. As depicted, the portion of a concept hierarchy 500 includes a concept, terms associated with the concept, and strings associated with the terms.

Each concept in an ontology may be assigned a unique identifier, and similar words or phrases for the concept may be grouped in the concept hierarchy according to terms that are also assigned unique identifiers. For example, the concept "C0004238" may refer to a specific form of fibrillation that occurs in the atrium of a heart. Strings for this concept include atrial fibrillation and atrial fibrillations, which are assigned to the term "L0004238," and auricular fibrillation and auricular fibrillations, which are assigned to the term "L0004327." Each string may thus represent a particular surface form for a concept in the concept hierarchy.

In exemplary embodiments, the concept identification module 145 and/or the concept linkage module 150, shown in FIG. 1, are configured to use one or more of the hierarchical ontology 400 and the concept hierarchy 500 to identify and link concepts in the set of documents. FIGS. 4 and 5 are shown for illustrative purposes only. Embodiments of a hierarchical ontology as shown in FIG. 4 can include any appropriate number and types of concepts that are represented and linked in any appropriate manner. Embodiments of a concept hierarchy as shown in FIG. 5 can include any appropriate number and types of concepts, terms, and strings that are represented and linked in any appropriate manner.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 6:
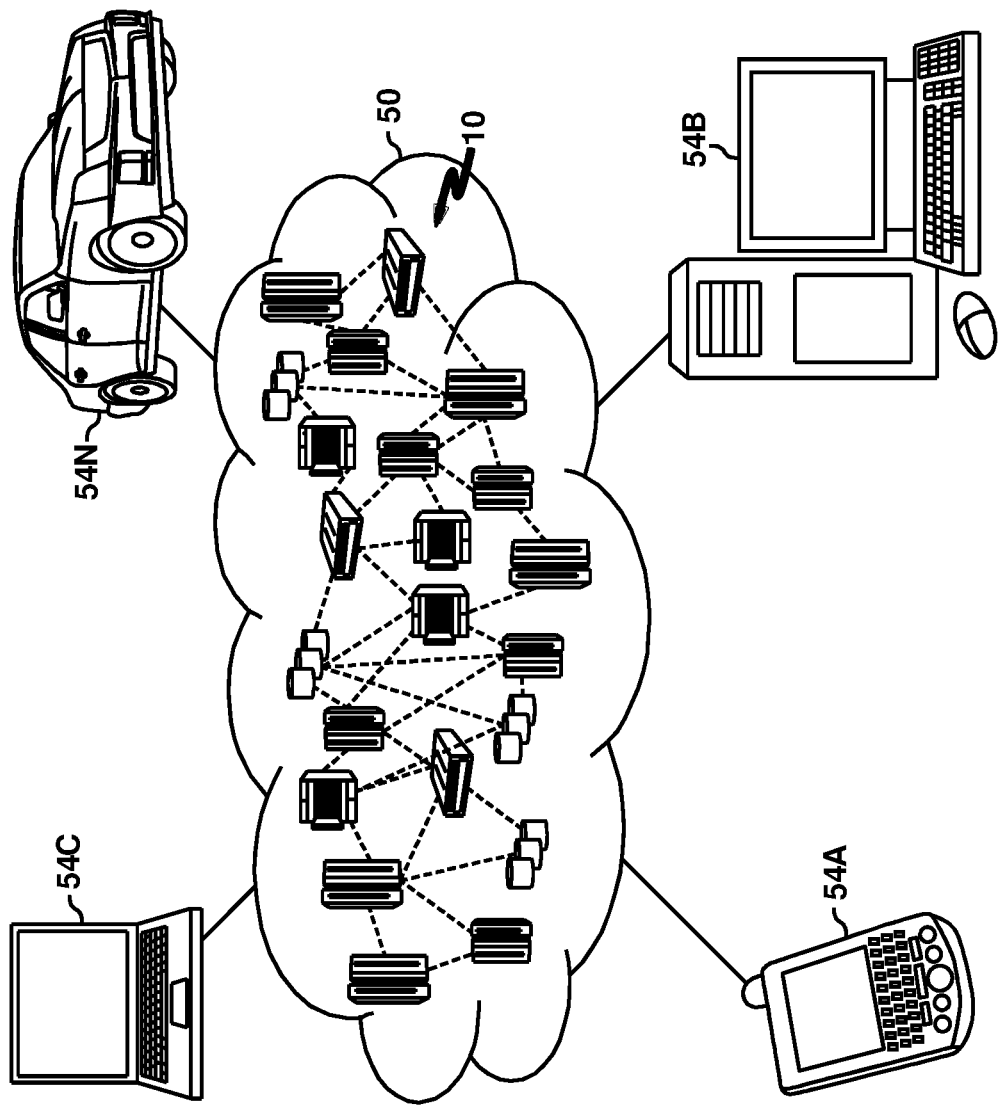
FIG. 6 depicts a cloud computing environment according to an embodiment of the present invention.

Referring now to FIG. 6, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54 shown in FIG. 6 are intended to be illustrative only and that computing nodes 10 and cloud computing environment 50 can communicate with any type of computerized device over any type of network and/or network addressable connection (e.g., using a web browser).

Figure 7:
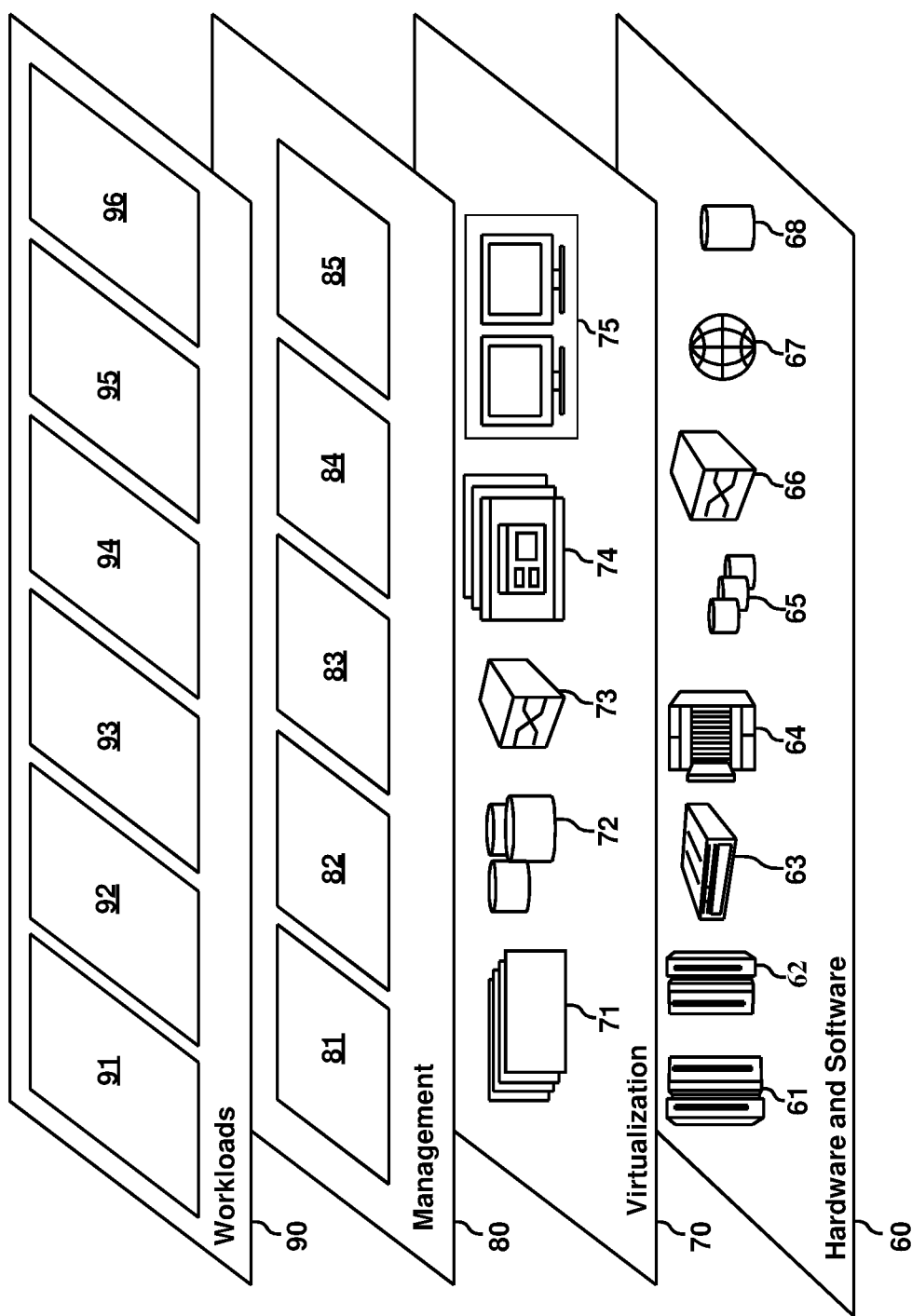
FIG. 7 depicts abstraction model layers according to an embodiment of the present invention.

Referring now to FIG. 7, a set of functional abstraction layers provided by cloud computing environment 50 (FIG. 6) is shown. It should be understood in advance that the components, layers, and functions shown in FIG. 7 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described herein. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and NLP service 96.

Figure 8:
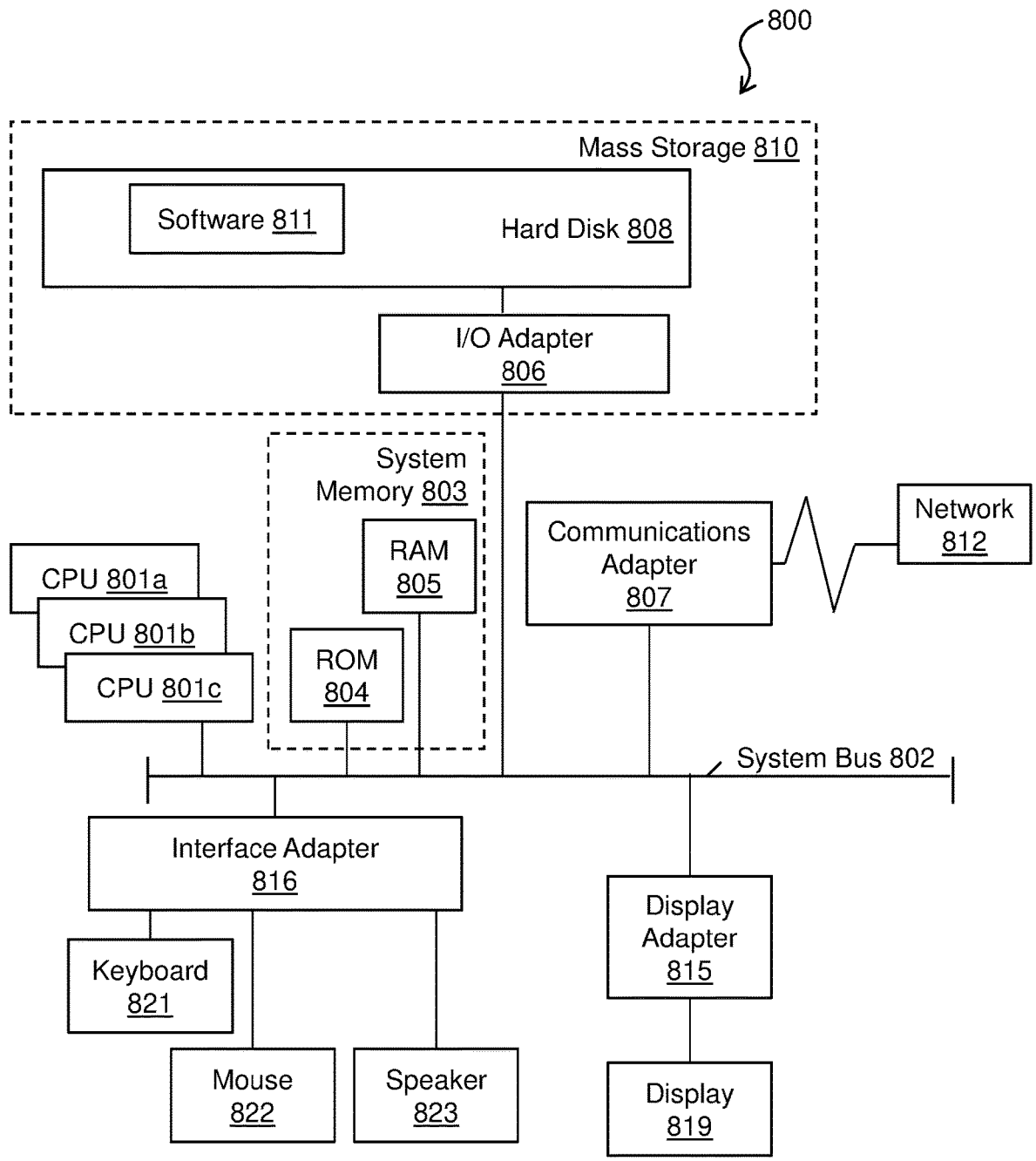
FIG. 8 is a block diagram of an example computer system for use in conjunction with one or more embodiments of concept disambiguation for natural language processing.

Turning now to FIG. 8, a computer system 800 is generally shown in accordance with an embodiment. The computer system 800 can be an electronic, computer framework comprising and/or employing any number and combination of computing devices and networks utilizing various communication technologies, as described herein. The computer system 800 can be easily scalable, extensible, and modular, with the ability to change to different services or reconfigure some features independently of others. The computer system 800 may be, for example, a server, desktop computer, laptop computer, tablet computer, or smartphone. In some examples, computer system 800 may be a cloud computing node. Computer system 800 may be described in the general context of computer system executable instructions, such as program modules, being executed by a computer system. Generally, program modules may include routines, programs, objects, components, logic, data structures, and so on that perform particular tasks or implement particular abstract data types. Computer system 800 may be practiced in distributed cloud computing environments where tasks are performed by remote processing devices that are linked through a communications network. In a distributed cloud computing environment, program modules may be located in both local and remote computer system storage media including memory storage devices.

As shown in FIG. 8, the computer system 800 has one or more central processing units (CPU(s)) 801*a*, 801*b*, 801*c*, etc. (collectively or generically referred to as processor(s) 801). The processors 801 can be a single-core processor, multi-core processor, computing cluster, or any number of other configurations. The processors 801, also referred to as processing circuits, are coupled via a system bus 802 to a system memory 803 and various other components. The system memory 803 can include a read only memory (ROM) 804 and a random access memory (RAM) 805. The ROM 804 is coupled to the system bus 802 and may include a basic input/output system (BIOS), which controls certain basic functions of the computer system 800. The RAM is read-write memory coupled to the system bus 802 for use by the processors 801. The system memory 803 provides temporary memory space for operations of said instructions during operation. The system memory 803 can include random access memory (RAM), read only memory, flash memory, or any other suitable memory systems.

The computer system 800 comprises an input/output (I/O) adapter 806 and a communications adapter 807 coupled to the system bus 802. The I/O adapter 806 may be a small computer system interface (SCSI) adapter that communicates with a hard disk 808 and/or any other similar component. The I/O adapter 806 and the hard disk 808 are collectively referred to herein as a mass storage 810.

Software 811 for execution on the computer system 800 may be stored in the mass storage 810. The mass storage 810 is an example of a tangible storage medium readable by the processors 801, where the software 811 is stored as instructions for execution by the processors 801 to cause the computer system 800 to operate, such as is described herein with respect to the various Figures. Examples of computer program product and the execution of such instruction is discussed herein in more detail. The communications adapter 807 interconnects the system bus 802 with a network 812, which may be an outside network, enabling the computer system 800 to communicate with other such systems. In one embodiment, a portion of the system memory 803 and the mass storage 810 collectively store an operating system, which may be any appropriate operating system, such as the z/OS or AIX operating system from IBM Corporation, to coordinate the functions of the various components shown in FIG. 8.

Additional input/output devices are shown as connected to the system bus 802 via a display adapter 815 and an interface adapter 816 and. In one embodiment, the adapters 806, 807, 815, and 816 may be connected to one or more I/O buses that are connected to the system bus 802 via an intermediate bus bridge (not shown). A display 819 (e.g., a screen or a display monitor) is connected to the system bus 802 by a display adapter 815, which may include a graphics controller to improve the performance of graphics intensive applications and a video controller. A keyboard 821, a mouse 822, a speaker 823, etc. can be interconnected to the system bus 802 via the interface adapter 816, which may include, for example, a Super I/O chip integrating multiple device adapters into a single integrated circuit. Suitable I/O buses for connecting peripheral devices such as hard disk controllers, network adapters, and graphics adapters typically include common protocols, such as the Peripheral Component Interconnect (PCI). Thus, as configured in FIG. 8, the computer system 800 includes processing capability in the form of the processors 801, and, storage capability including the system memory 803 and the mass storage 810, input means such as the keyboard 821 and the mouse 822, and output capability including the speaker 823 and the display 819.

In some embodiments, the communications adapter 807 can transmit data using any suitable interface or protocol, such as the internet small computer system interface, among others. The network 812 may be a cellular network, a radio network, a wide area network (WAN), a local area network (LAN), or the Internet, among others. An external computing device may connect to the computer system 800 through the network 812. In some examples, an external computing device may be an external webserver or a cloud computing node.

It is to be understood that the block diagram of FIG. 8 is not intended to indicate that the computer system 800 is to include all of the components shown in FIG. 8. Rather, the computer system 800 can include any appropriate fewer or additional components not illustrated in FIG. 8 (e.g., additional memory components, embedded controllers, modules, additional network interfaces, etc.). Further, the embodiments described herein with respect to computer system 800 may be implemented with any appropriate logic, wherein the logic, as referred to herein, can include any suitable hardware (e.g., a processor, an embedded controller, or an application specific integrated circuit, among others), software (e.g., an application, among others), firmware, or any suitable combination of hardware, software, and firmware, in various embodiments.

Various embodiments of the invention are described herein with reference to the related drawings. Alternative embodiments of the invention can be devised without departing from the scope of this invention. Various connections and positional relationships (e.g., over, below, adjacent, etc.) are set forth between elements in the following description and in the drawings. These connections and/or positional relationships, unless specified otherwise, can be direct or indirect, and the present invention is not intended to be limiting in this respect. Accordingly, a coupling of entities can refer to either a direct or an indirect coupling, and a positional relationship between entities can be a direct or indirect positional relationship. Moreover, the various tasks and process steps described herein can be incorporated into a more comprehensive procedure or process having additional steps or functionality not described in detail herein.

One or more of the methods described herein can be implemented with any or a combination of the following technologies, which are each well known in the art: a discrete logic circuit(s) having logic gates for implementing logic functions upon data signals, an application specific integrated circuit (ASIC) having appropriate combinational logic gates, a programmable gate array(s) (PGA), a field programmable gate array (FPGA), etc.

For the sake of brevity, conventional techniques related to making and using aspects of the invention may or may not be described in detail herein. In particular, various aspects of computing systems and specific computer programs to implement the various technical features described herein are well known. Accordingly, in the interest of brevity, many conventional implementation details are only mentioned briefly herein or are omitted entirely without providing the well-known system and/or process details.

In some embodiments, various functions or acts can take place at a given location and/or in connection with the operation of one or more apparatuses or systems. In some embodiments, a portion of a given function or act can be performed at a first device or location, and the remainder of the function or act can be performed at one or more additional devices or locations.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

The corresponding structures, materials, acts, and equivalents of all means or step plus function elements in the claims below are intended to include any structure, material, or act for performing the function in combination with other claimed elements as specifically claimed. The present disclosure has been presented for purposes of illustration and description, but is not intended to be exhaustive or limited to the form disclosed. Many modifications and variations will be apparent to those of ordinary skill in the art without departing from the scope and spirit of the disclosure. The embodiments were chosen and described in order to best explain the principles of the disclosure and the practical application, and to enable others of ordinary skill in the art to understand the disclosure for various embodiments with various modifications as are suited to the particular use contemplated.

The diagrams depicted herein are illustrative. There can be many variations to the diagram or the steps (or operations) described therein without departing from the spirit of the disclosure. For instance, the actions can be performed in a differing order or actions can be added, deleted, or modified. Also, the term "coupled" describes having a signal path between two elements and does not imply a direct connection between the elements with no intervening elements/connections therebetween. All of these variations are considered a part of the present disclosure.

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "exemplary" is used herein to mean "serving as an example, instance or illustration." Any embodiment or design described herein as "exemplary" is not necessarily to be construed as preferred or advantageous over other embodiments or designs. The terms "at least one" and "one or more" are understood to include any integer number greater than or equal to one, i.e. one, two, three, four, etc. The terms "a plurality" are understood to include any integer number greater than or equal to two, i.e. two, three, four, five, etc. The term "connection" can include both an indirect "connection" and a direct "connection."

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instruction by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

What is claimed is:

1. A computer-implemented method for cross-document propagation of entity metadata comprising:
    identifying a set of documents from a plurality of documents, the set of documents being related to one another;
    identifying a concept in a first document of the set of documents and creating an annotation corresponding to the concept, wherein the annotation includes an indication of the concept, a value associated with the annotation that is extracted from the first document, and a date that the value was obtained that is extracted from the first document;
    evaluating the annotation from the first document against all of the documents in the set of documents;
    identifying a concept match between the annotation and a mention discovered in a second document in the set of documents;
    creating a metadata linkage between the concept in the first document to the mention in the second document; and
    displaying the second document to a user, wherein the mention in the second document includes an indication of the annotation,
    wherein the annotation is presented as a footnote that includes a value associated with the annotation that was extracted from the first document, an indication of the concept, and a link to open the first document.

2. The method of claim 1, wherein each of the plurality of documents includes metadata that identifies a subject of the document.

3. The method of claim 2, wherein the set of documents are identified as being related to one another based at least in part upon a determination that each of the set of documents relates to a common subject.

4. The method of claim 2, further comprising storing the metadata linkage in the metadata of the first document and the second document.

5. The method of claim 1, wherein the concept and the mention are identified based at least in part on a natural language processing (NLP) analysis of the first document and the second document, respectively.

6. The method of claim 1, wherein the indication of the annotation also includes an identification of the first document.

7. A system comprising:
    a memory having computer readable instructions; and
    one or more processors for executing the computer readable instructions, the computer readable instructions controlling the one or more processors to perform operations comprising:
        identifying a set of documents from a plurality of documents, the set of documents being related to one another;
        identifying a concept in a first document of the set of documents and creating an annotation corresponding to the concept, wherein the annotation includes an indication of the concept, a value associated with the annotation that is extracted from the first document, and a date that the value was obtained that is extracted from the first document;
        evaluating the annotation from the first document against all of the documents in the set of documents;
        identifying a concept match between the annotation and a mention discovered in a second document in the set of documents;

creating a metadata linkage between the concept in the first document to the mention in the second document; and displaying the second document to a user, wherein the mention in the second document includes an indication of the annotation, wherein the annotation is presented as a footnote that includes a value associated with the annotation that was extracted from the first document, an indication of the concept, and a link to open the first document.

8. The system of claim 7, wherein each of the plurality of documents includes metadata that identifies a subject of the document.

9. The system of claim 8, wherein the set of documents are identified as being related to one another based at least in part upon a determination that each of the set of documents relates to a common subject.

10. The system of claim 8, wherein the operations further comprise storing the metadata linkage in the metadata of the first document and the second document.

11. The system of claim 7, wherein the concept and the mention are identified based at least in part on a natural language processing (NLP) analysis of the first document and the second document, respectively.

12. The system of claim 7, wherein the indication of the annotation also includes an identification of the first document.

13. A computer program product comprising a computer readable storage medium having program instructions embodied therewith, the program instructions executable by one or more processors to cause the one or more processors to perform operations comprising:

identifying a set of documents from a plurality of documents, the set of documents being related to one another;

identifying a concept in a first document of the set of documents and creating an annotation corresponding to the concept, wherein the annotation includes an indication of the concept, a value associated with the annotation that is extracted from the first document, and a date that the value was obtained that is extracted from the first document;

evaluating the annotation from the first document against all of the documents in the set of documents;

identifying a concept match between the annotation and a mention discovered in a second document in the set of documents;

creating a metadata linkage between the concept in the first document to the mention in the second document; and displaying the second document to a user, wherein the mention in the second document includes an indication of the annotation, wherein the annotation is presented as a footnote that includes a value associated with the annotation that was extracted from the first document, an indication of the concept, and a link to open the first document.

14. The computer program product of claim 13, wherein each of the plurality of documents includes metadata that identifies a subject of the document.

15. The computer program product of claim 14, wherein the set of documents are identified as being related to one another based at least in part upon a determination that each of the set of documents relates to a common subject.

16. The computer program product of claim 14, wherein the operations further comprise storing the metadata linkage in the metadata of the first document and the second document.

* * * * *